Feb. 3, 1948. E. LANDIS 2,435,359
OIL TANK FOR LUBRICATING SYSTEMS
Filed Oct. 19, 1945 2 Sheets-Sheet 1

Inventor
Elmer Landis,
JE Beringer
Attorney

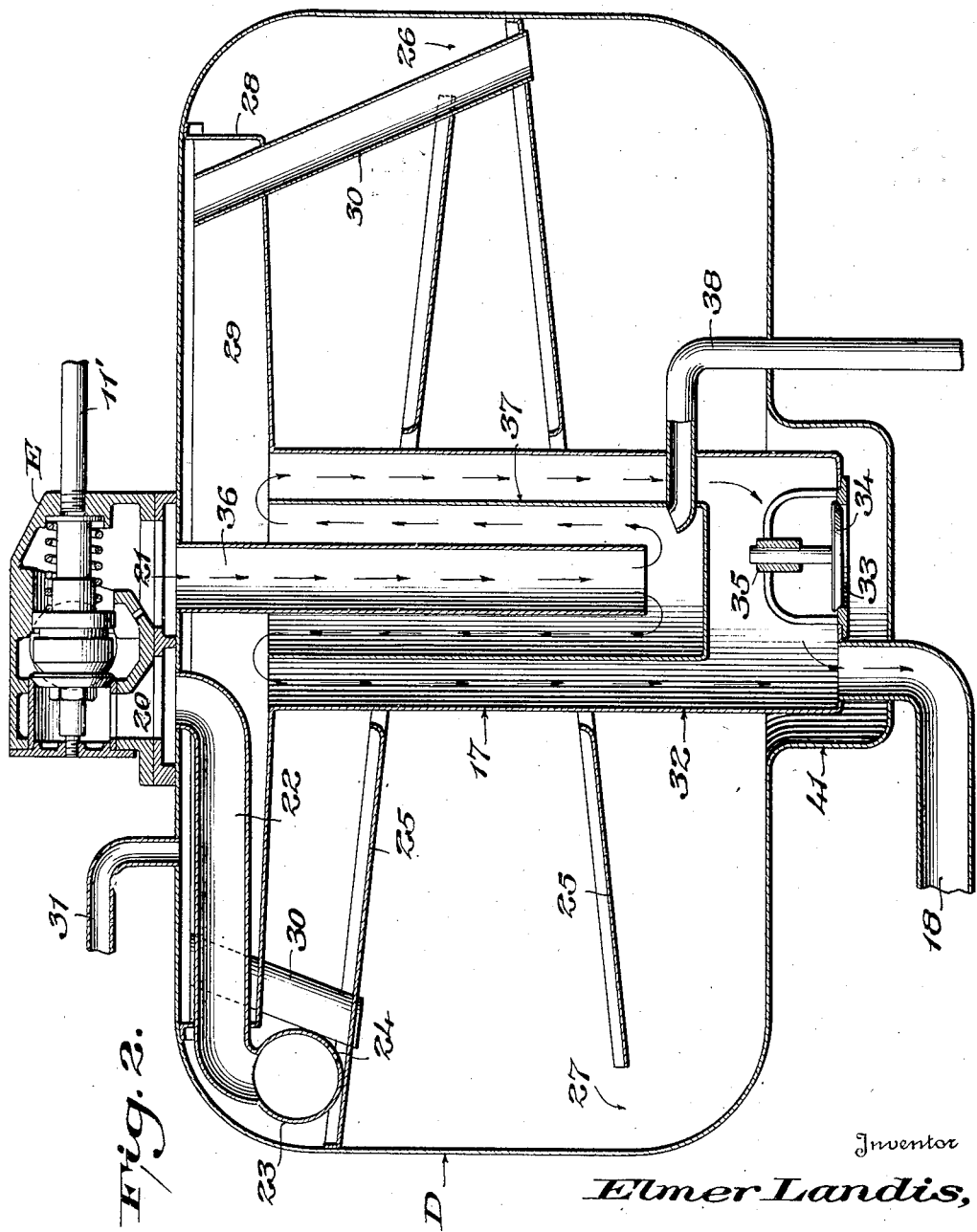

Patented Feb. 3, 1948

2,435,359

UNITED STATES PATENT OFFICE 2,435,359

OIL TANK FOR LUBRICATING SYSTEMS

Elmer Landis, Clayton, Ohio, assignor to United Aircraft Products, Inc., Dayton, Ohio, a corporation of Ohio Application October 19, 1945, Serial No. 623,253

4 Claims. (Cl. 137—21)

This invention relates to lubricating systems for aircraft and other engines, and has particular reference to improvements in oil tanks such as are used in such systems.

Most oils such as are used for the lubrication of air craft and other engines will congeal at low temperatures and, if permitted to congeal during periods of engine idleness, may render subsequent engine starting very difficult and even impossible. It is therefore known practice to dilute engine lubricating oil with gasoline or the like to facilitate engine starting following periods of engine idleness when the atmospheric temperature is so low as to congeal the oil if it is undiluted. Since, however, dilution of the oil detracts from its lubricating efficiency, it is further known practice to dilute only part of the oil for engine starting purposes. In this connection, one primary purpose of an oil tank of the type used in engine lubricating systems is to separate a minor, diluted portion of the oil from the main body thereof. To this end, the oil tank is provided with means defining a path for flow of oil therethrough in by-passing relationship to oil in the tank proper, and valve means, operable in response to the temperature of the oil and particularly to supply of gasoline or other diluent to the oil, is provided to confine the diluted oil to said by-pass path of flow in its passage through the tank. The gasoline or other diluent is supplied prior to stopping of the engine and thus a minor, diluted portion of the oil is available for subsequent, easy engine starting purposes. Moreover, when the engine is started, heating of the diluted portion of the oil results in heating of the undiluted, congealed, main body of the oil in the tank proper and in operation of the valve means to direct the oil through the tank proper where it is deaerated and thereby conditioned for most efficient use.

According to the present invention, the means defining the path for flow of oil through the tank in by-passing relationship to the tank proper, includes a conduit element disposed in the tank and having connected therewith the oil outlet pipe leading from the tank. In this connection, to provide for flow of oil from the tank proper to said outlet pipe and to prevent diluted oil from flowing from the by-pass path of flow to the tank proper, the said conduit element is in communication with the tank proper under the control of a check valve which opens toward said conduit and closes toward said tank proper. The present invention is concerned particularly with said check valve and has for its primary object to construct and arrange the same so that advantage may be taken of the full head pressure of the oil in the conduit element to close the same and to hold the same closed. Thus, only a relatively small quantity of oil is required to be present in the conduit element to balance the pressure of the oil in the tank proper and to close said valve and to maintain the same closed. Consequently, springs, weights or the like are not required for this purpose. On the contrary, said valve is sensitive in operation and little or no pressure drop or flow of oil from the conduit element to the tank proper occurs therethrough.

According to the invention, the said check valve is of the poppet type and is vertically disposed and cooperates with a port in the bottom of the conduit element, and in this connection another object of the invention is to provide the tank with a sump and to dispose the bottom portion of the conduit element therein, whereby flow of oil between the tank proper and the oil outlet pipe is assured even though the amount of oil in the system becomes so depleted that the tank contains very little oil.

With the foregoing and other objects in view, which will become more fully apparent as the nature of the invention is better understood, the same consists in an oil tank for lubricating systems embodying the novel features of construction, combination and arrangement of parts, particularly with respect to the aforesaid check valve feature thereof, as will be hereinafter more fully described, illustrated in the accompanying drawings and defined in the appended claims.

In the accompanying drawings, wherein like characters of reference denote corresponding parts in the different views:

Fig. 2 is an enlarged, vertical, longitudinal section through the oil tank; and

Figure 1:
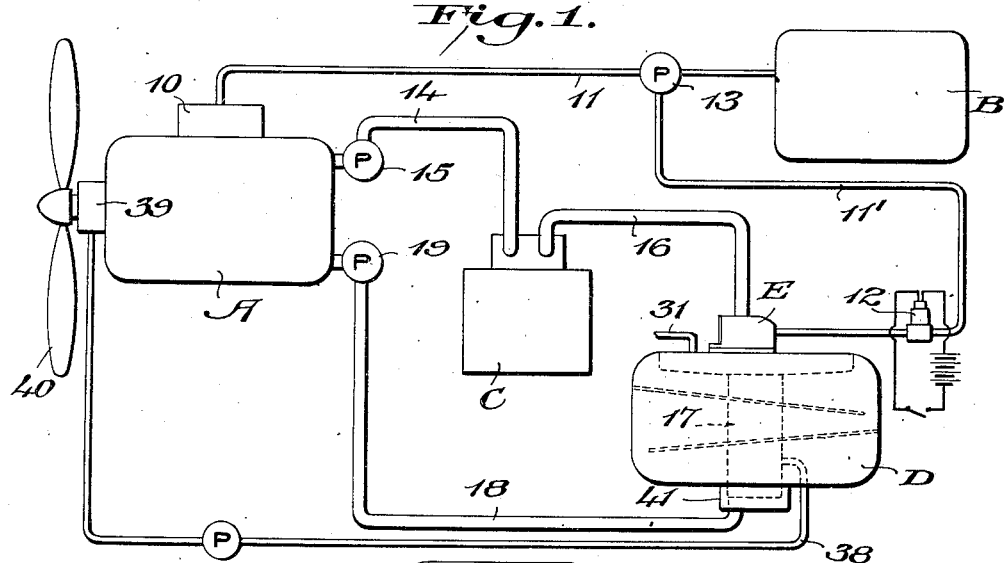
Fig. 1 is a diagrammatic view of an engine fuel supply and lubricating system embodying an oil tank in accordance with the invention.
Figure 3:
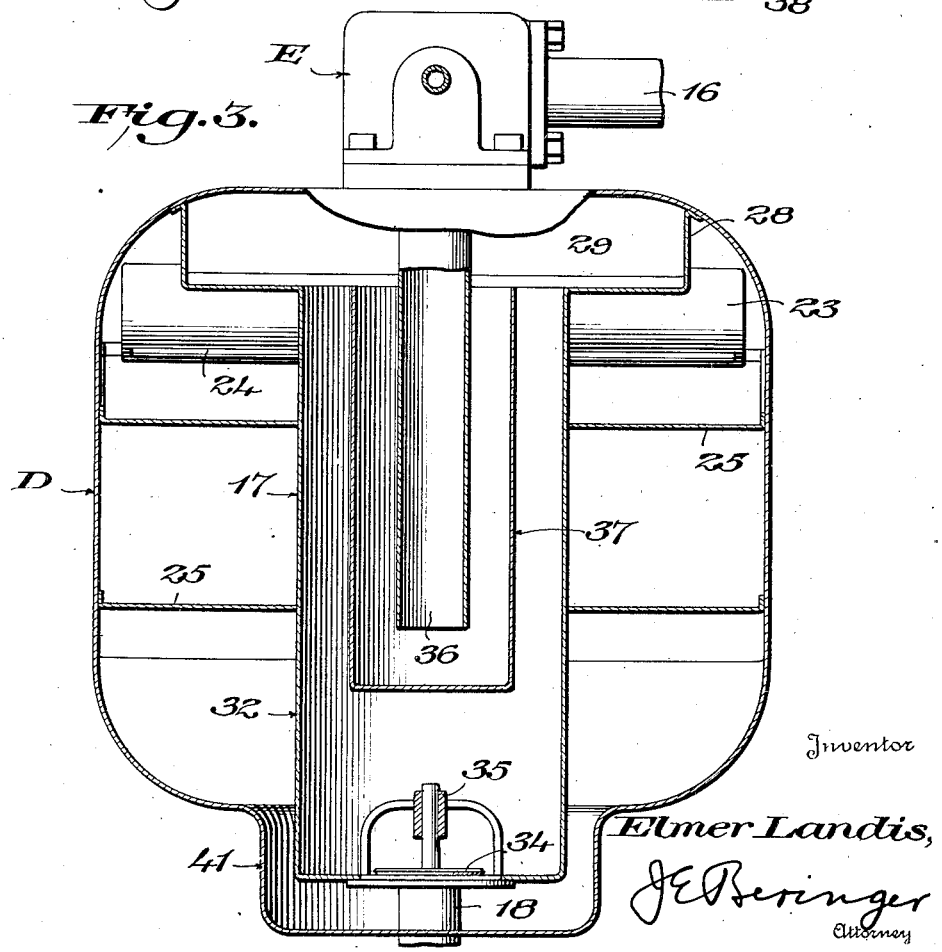
Fig. 3 is a central, vertical, transverse section through the oil tank.

Referring to the drawings in detail, first with particular reference to Fig. 1, A designates, generally, an engine such as an aircraft engine; B designates a tank to contain gasoline or other liquid fuel for operating the engine A; C designates an oil cooler interposed in the lubricating system of the engine A; D designates, generally, an oil tank also interposed in the engine lubricating system and with which the present invention particularly is concerned, and E designates, generally, a valve controlling flow of oil to the tank D and admission of a diluent, such as gasoline, to the oil.

The fuel tank B is connected to the carburetor 10 of the engine A by a fuel supply pipe 11. It also is connected with the valve E by a branch 11' of the pipe 11. In the branch 11' is a suitable valve 12 which may be electrically or otherwise operable at will, whereby any desired amount of gasoline may be supplied at any desired time from the fuel tank B to the valve E for oil dilution purposes. As usual, a pump 13 is interposed in the pipe 11 for forcing fuel from the fuel tank B to the engine A and to the valve E.

From the engine A a lubricating oil return pipe 14 leads to and is connected with the inlet of the oil cooler C, and in said pipe may be interposed a pump 15 for effecting positive return flow of oil from the engine to said cooler. From the outlet of the cooler C a pipe 16 leads to and is connected with the inlet of the valve E. In the oil tank D is means, designated generally as 17, defining a path for flow of oil through said tank in by-passing relationship to oil contained in said tank proper. From the bottom of this means an oil supply pipe 18 leads to and is connected with the engine A, and in said pipe 18 may be interposed a pump 19 for effecting positive flow of oil to the engine A.

The valve E has two outlets 20 and 21, the first of which is connected by a pipe 22 with a manifold 23 disposed within the tank D adjacent to its top and near one end thereof, and the second of which is connected with the top of the by-pass flow path defining means 17.

The valve E is of a thermally operable type, operable by the temperature of the oil flowing therethrough and by the temperature of the gasoline or other diluent supplied therethrough to the oil, to direct the oil either to the manifold 23 or to the by-pass flow path defining means 17. No novelty is claimed respecting said valve per se and therefore the same has not been illustrated in detail, particularly as the same is well known. Suffice it to say that if the oil is at or above a predetermined temperature it is directed by said valve to the manifold 23, and if it is below said predetermined pressure it is directed to the by-pass flow path defining means 17.

The manifold 23 extends transversely of the tank D substantially from side to side thereof and has an oil outlet opening in the form of a long, narrow slot 24 which extends longitudinally thereof either from end to end thereof or, in any event, throughout a considerable portion of the width of the tank D. Thus, oil delivered to said manifold flows therefrom through the slot 24 in the form of a wide, relatively thin sheet.

In the tank D are any desired number of substantially horizontally disposed, vertically spaced apart baffle plates 25 which extend from side to side and substantially from end to end of said tank. The uppermost of these baffle plates underlies the manifold 23 and extends from the end of the tank D nearer said manifold at a small downward inclination toward the other end of said tank from which it is suitably spaced as indicated at 26. The next lower baffle plate extends from the last mentioned end of the tank D at a small downward inclination toward the first mentioned end of said tank from which it is suitably spaced as indicated at 27. Only two of these baffle plates 25 are illustrated in the present instance, but more may be provided if desired. In any event, their arrangement is such as to reduce splashing or turbulence of oil in the tank D and to provide a zig-zag path for flow of oil downwardly through the tank from end to end thereof. The oil flows in a broad, thin stream or band over said baffle plates and thereby any air contained therein is permitted to escape therefrom.

In the top portion of the tank D is a tray 28 which cooperates with the top wall of said tank to afford an air space 29 which is in communication with the spaces below the baffle plates 25 through open-ended tubes 30. Thus, any air released from oil flowing over the baffle plates 25 may enter the space 29 through said tubes 30. The space 29 is suitably vented as indicated at 31. Thus, when the oil flows through the tank D proper, it is deaerated and thereby better conditioned for use.

The by-pass path of flow defining means 17 includes a conduit element in the form of an open-top hopper 32 disposed vertically within the tank D, preferably centrally thereof, and connected at its open top with the tray 28 so that any oil which, due to foaming thereof or which for any other reason may be carried through the tubes 30 to said tray, or which otherwise may reach said tray, may drain therefrom into said hopper. At its bottom, said hopper is closed except that it has the oil pipe 18 leading therefrom and except that it is provided with a port 33 affording communication between the same and the tank proper under the control of a check valve 34.

While the check valve 34 may be of the pivoted flap type or any other suitable type, it preferably is of the poppet type shown. In any event, it is disposed within the hopper 32 at the bottom thereof to open upwardly and to close downwardly; i. e., to permit flow of oil from the tank D proper into said hopper and to prevent flow of oil from said hopper into said tank D proper. Moreover, it is disposed horizontally; i. e., with its axis extending vertically, to take advantage of the full head pressure of the oil in the hopper 32 to close the same and to maintain the same closed when the valve E is directing the oil through the by-pass path 17. If it is of the poppet type shown, any suitable means, such as the means indicated at 35, may be provided to guide it in its opening and closing movements and to maintain it in operative relationship to the port 33.

From the second outlet 21 of the valve E a tube 36 depends into a cup-like oil reservoir 37 which is disposed within the hopper 32 and from which a pipe 38 or a plurality of such pipes may lead to any device or devices to be hydraulically operated, one such device 39 being illustrated in Fig. 1 of the drawings as for the purpose of feathering the blades of a propeller 40 driven by the engine A. In any event, the reservoir 37 insures a supply of oil and particularly a supply of diluted oil for any desired purpose or purposes when a diluent has been supplied to the oil and the valve E is positioned to cause the oil to flow through the by-pass path 17. In other words, oil flowing from the outlet 21 of the valve E is directed into the reservoir 37 by the tube 36 and overflows from said reservoir into the hopper 32. Therefore, a supply of oil is maintained in the reservoir 37.

The operation of a system such as illustrated is well understood and, briefly, is as follows: Under normal conditions the temperature of the oil is such as to actuate the valve E to direct all or most of the oil through the valve outlet 20 into the tank D proper where it is deaerated and from whence it flows to the outlet pipe 18 via the port 33 in the bottom of the hopper 32, the valve 34 readily opening upward to permit this flow because of the lack of pressure in the hopper 32. If, however, the temperature of the oil should drop below a predetermined value, the valve E will operate to direct the oil through the outlet 21 to the pipe 18 via the tube 36, the reservoir 37 and the hopper 32 in by-passing relationship to oil in the tank D proper. If atmospheric temperature conditions are such as to cause the oil, if undiluted, to congeal when the engine A is idle, the valve 12 is opened at a suitable time prior to stopping of the engine and thereby raw gasoline is admitted through the valve E to the lubricating system. This raw gasoline is cold and, consequently, causes the valve E to operate to deny communication between the pipe 16 and the outlet opening 20 and to establish communication between said pipe 16 and the outlet opening 21. Consequently, the oil in the tank D proper is by-passed and only the oil in the system exclusive of the oil in the tank D proper becomes diluted. When this oil becomes sufficiently diluted the valve 12 is closed to cut off the supply of diluting gasoline and the engine is stopped when the diluted oil has become distributed in the system. Thus, even though the atmospheric temperature may be so low as to congeal the undiluted oil in the tank D proper while the engine is idle, the diluted oil will permit ready starting of the engine whenever desired. Moreover, the reservoir 37 will insure a supply of diluted oil for operating devices such as the propeller feathering device 39 when the main body of the oil is diluted.

Upon starting and warm-up of the engine, the diluted oil flowing through the by-pass flow path 17 gradually heats the oil in the tank D proper until normal flow through the tank D proper is effected. Subsequent operation of the engine then results in vaporization of the diluting gasoline and its removal from the oil.

Obviously, when the valve E directs the oil through the by-pass flow path 17 the valve 34 closes and confines the oil to said by-pass path, and in this connection, since said valve 34 is of the type shown and is arranged as shown it takes advantage of the full head pressure of the oil in the hopper 32 to close the same and to maintain the same closed as long as the flow is through said by-pass path. Springs or the like to close said valve and to maintain the same closed therefore are not required. Moreover, said valve is sensitive in operation and little or no pressure drop or flow of oil from the hopper 32 to the tank D proper occurs therethrough. The weight of said valve plus the head of oil in the hopper 32 maintains said valve normally closed against the head of the more dense oil in the tank proper.

Preferably the tank D is provided with a sump 41 into which the bottom of the hopper 32 extends, whereby flow is assured between the tank proper and the pipe 18 even though the amount of oil in the system becomes so depleted that the tank proper contains very little oil.

From the foregoing description considered in connection with the accompanying drawings, it is believed that the features comprising the invention will be clearly understood and their advantages appreciated. It is desired to point out, however, that while only a single, specific structural embodiment of the invention has been illustrated and described, the same is readily susceptible of specifically different structural embodiments within its spirit and scope as defined in the appended claims.

I claim:

1. In an oil tank for lubricating systems, means in said tank defining a path for flow of oil therethrough in by-passing relationship to oil in the tank proper, said means including a hopper, an outlet pipe connected to said hopper, means for introducing a diluent into the oil, valve means operable by the temperature of the oil to direct the oil either to said tank proper or to said by-pass path of flow defining means, said hopper including side and bottom walls and having in its bottom wall a port affording communication between the tank proper and said hopper, and an upwardly opening downwardly closing horizontally disposed check valve in the bottom portion of said hopper cooperating with said port to control flow of oil therethrough.

2. In an oil tank for lubricating systems, means in said tank defining a path for flow of oil therethrough in by-passing relationship to oil in the tank proper, said means including a hopper, an outlet pipe connected to said hopper, means for introducing a diluent into the oil, valve means operable by the temperature of the oil to direct the oil either to said tank proper or to said by-pass path of flow defining means, said hopper including side and bottom walls and having in its bottom wall a port affording communication between the tank proper and said hopper, and an upwardly opening downwardly closing horizontally disposed check valve of the poppet type in the bottom portion of said hopper cooperating with said port to control flow of oil therethrough.

3. In an oil tank for lubricating systems, means in said tank defining a path for flow of oil therethrough in by-passing relationship to oil in the tank proper, said means including a hopper, an outlet pipe connected to said hopper, means for introducing a diluent into the oil, valve means operable by the temperature of the oil to direct the oil either to said tank proper or to said by-pass path of flow defining means, said hopper including side and bottom walls and having in its bottom wall a port affording communication between the tank proper and said hopper, and an upwardly opening downwardly closing horizontally disposed check valve in the bottom portion of said hopper cooperating with said port to control flow of oil therethrough, said tank having a bottom sump in which the lower end portion of said hopper is disposed.

4. In an oil tank for lubricating systems, means in said tank defining a path for flow of oil therethrough in by-passing relationship to oil in the tank proper, said means including a hopper, an outlet pipe connected to said hopper, means for introducing a diluent into the oil, valve means operable by the temperature of the oil to direct the oil either to said tank proper or to said by-pass path of flow defining means, said hopper including side and bottom walls and having in its bottom wall a port affording communication between the tank proper and said hopper, and an upwardly opening downwardly closing horizontally disposed check valve of the puppet type in the bottom portion of said hopper cooperating with said port to conrol flow of oil therethrough, said tank having a bottom sump in which the lower end portion of said hopper is disposed.

ELMER LANDIS.